(12) United States Patent
Moriyoshi

(10) Patent No.: US 6,549,576 B1
(45) Date of Patent: Apr. 15, 2003

(54) MOTION VECTOR DETECTING METHOD AND APPARATUS

(75) Inventor: Tatsuji Moriyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/502,669

(22) Filed: Feb. 11, 2000

(30) Foreign Application Priority Data

Feb. 15, 1999 (JP) .......................................... 11/036197

(51) Int. Cl.$^7$ ................................................ H04N 7/18
(52) U.S. Cl. .............................. 375/240.16; 375/240.17
(58) Field of Search ........................ 375/240.12–240.17

(56) References Cited

U.S. PATENT DOCUMENTS

| | | | | |
|---|---|---|---|---|
| 5,428,403 A | * | 6/1995 | Andrew et al. | 348/699 |
| 5,475,446 A | * | 12/1995 | Yamada et al. | 348/409.1 |
| 5,883,674 A | * | 3/1999 | Ogura | 348/699 |
| 6,269,174 B1 | * | 7/2001 | Koba et al. | 348/154 |
| 6,289,050 B1 | * | 9/2001 | Ohtani et al. | 375/240.16 |

FOREIGN PATENT DOCUMENTS

| | | |
|---|---|---|
| JP | 1-179584 | 7/1989 |
| JP | 2-13079 | 1/1990 |
| JP | 2-131690 | 5/1990 |
| JP | 2-145079 | 6/1990 |
| JP | 4-150284 | 5/1992 |
| JP | 4-180383 | 6/1992 |
| JP | 5-328333 | 12/1993 |
| JP | 6-86272 | 3/1994 |
| JP | 6-189291 | 7/1994 |
| JP | 7-162864 | 6/1995 |
| JP | 9-70046 | 3/1997 |
| JP | 10-98730 | 4/1998 |
| JP | 10-191350 | 7/1998 |

OTHER PUBLICATIONS

Japanese Office Action issued Feb. 20, 2002 (w/ English translation of relevant portion).
Japanese Office Action issued Feb. 19, 2001 in a related application with English translation of relevant portions.
Danieli Barnea, Harvey F. Silverman, "A Class of Algorithms for Fast Digital Image Registration," IEEE Transactions on Computer, vol. C–21, No. 2, pp. 179–186, Feb., 1972. See specification p. 5.
"Overlay of Image by Sequential Testing Method of Residual Difference," by Morio Onoue, Norihiko Maeda and Masaru Saitou, Information Processing, vol. 17, No. 7, pp. 634–640, Jul., 1976.

* cited by examiner

Primary Examiner—Andy Rao
(74) Attorney, Agent, or Firm—Dickstein, Shapiro, Morin & Oshinsky, LLP.

(57) ABSTRACT

A current image is supplied to a current image input circuit 10. Also, a reference image is inputted to a reference image input circuit 11. A search range setting circuit 12 sets a search range for detecting motion vectors to the reference image inputted from the reference image input circuit 11. A motion vector storage circuit 17 stores the motion vectors detected up to the present. A search order setting circuit 13 sets scan order of the search range set by the search range setting circuit 12 using information on the motion vectors stored in the motion vector storage circuit 17. A scan circuit 14 scans the inside of the search range of the reference image set by the search range setting circuit 12 in order set by the search order setting circuit 13. The search order setting circuit 13 sets search order using the information on the motion vectors stored in the motion vector storage circuit 17. Concretely, for example, a vector of the motion vector detection result of a block residing in the same position as the previous frame is set as a predictive vector of the motion vector of a block of an object of processing. Then, the end position of the predictive vector is set to the scan start position and scanning is spirally performed from the scan start position toward the vicinity of the outside of the search range.

31 Claims, 15 Drawing Sheets

BLOCK OF OBJECT OF PROCESSING

20 SEARCH RANGE

140 SEARCH RANGE

140 SEARCH RANGE

MOTION VECTOR DETECTING METHOD AND APPARATUS

BACKGROUD OF THE INVENTION

1. Field of the Invention

The present invention relates to motion vector detecting method and apparatus and, more particularly, to motion vector detecting method and apparatus for processing blocks having smaller residual difference at an early stage of search.

2. Description of the Related Art

Conventionally, as a highly efficient compression coding method of an animation, H.261 and H.263 of an ITU-T (International Telecommunication Union-Telecommunication Standardization Sector) recommendation or MPEG-1 and MPEG-2 of a MPEG (Moving Picture Expert Group) recommendation in ISO (International Organization for Standardization) etc. are known. They are the highly efficient compression coding technique of time-varying images formed of combinations of techniques such as DCT (Discrete Cosine Transformation), inter-frame prediction by motion compensation, quantization, and variable length coding.

FIG. 13 is one example of a predictive coding apparatus for coding images using inter-frame prediction by motion compensation. In FIG. 13, image data is supplied to an input unit 100. Also, image data (hereinafter called "reference image") of a frame connected in time series to a current input image (hereinafter called "current image") is stored in frame memory 102.

A motion vector detecting unit 101 obtains a motion vector indicating correspondence every minor area of both the images using the current image supplied from the input unit 100 and the reference image supplied from the frame memory 102. The obtained motion vector is supplied to a motion compensation unit 103. The motion compensation unit 103 performs motion compensation processing using the motion vector supplied from the motion vector detecting unit 101 and the reference image supplied from the frame memory 102, and obtains image data (hereinafter called "predictive image") to which the motion compensation processing is performed.

A subtracter 104 obtains image data (hereinafter called "predictive difference image") subtracting the predictive image from the current image using the current image supplied from the input unit 100 and the predictive image supplied from the motion compensation unit 103.

A DCT (Discrete Cosine Transformation) unit 105 performs DCT to the predictive difference image supplied from the subtracter 104 and obtains a coefficient of DCT.

A quantizing unit 106 performs quantization processing to the coefficient of DCT supplied from the DCT unit 105. Output of the quantizing unit 106 is outputted from an output unit 107. Also, the output of the quantizing unit 106 is supplied to an inverse quantizing unit 108.

The inverse quantizing unit 108 performs inverse quantization processing to the quantized coefficient of DCT supplied from the quantizing unit 106 and obtains a coefficient of DCT. An inverse DCT unit 109 performs inverse DCT processing to the coefficient of DCT supplied from the inverse quantizing unit 108 and obtains difference data from the reference image.

An adder 110 adds the difference data to the predictive image to restore the current image using the difference data supplied from the inverse DCT unit 109 and the predictive image supplied from the motion compensation unit 103.

The frame memory 102 stores the restored current image supplied from the adder 110.

A switching unit 111 switches whether inter-frame prediction is performed or not, and the inter-frame prediction is performed if the switching unit 111 is turned on and the inter-frame prediction is not performed if the switching unit 111 is turned off.

In the compression coding using the inter-frame prediction thus, the difference data between the current image and the predictive image obtained by performing the motion compensation processing is encoded on the basis of the motion vector detected by the motion vector detecting unit. Because of this, the higher the detecting accuracy of the motion vector detected by the motion vector detecting unit, the smaller the amount of information on the difference data, with the result that coding efficiency is improved.

FIG. 14 illustrates motion vector detection used in the compression coding using such an inter-frame prediction. In FIG. 14, numeral 120 designates a current image and numeral 121 designates a reference image. In the motion vector detection, an image is divided into minor areas (hereinafter called "block") and a motion vector is obtained every block. For this purpose, a block 124 best matching a block 122 of the current image is detected within a search range 123 set in the reference image 121 to the block 122 within the current image 120.

The difference in position within the image between the block 122 of the current image and the block 124 best matching the block 122 within the search range 123 of the reference image in this case is a motion vector 125. As an evaluation value of matching between blocks, a total of square or absolute value of the difference of each pixel value within the block is often used. The case of using the total of absolute value of the difference of each pixel value within the block as the evaluation value of matching will be described below, and the total of absolute value of the difference of each pixel value within this block is called "residual difference".

As a method of motion vector detection, a block matching method is known. In the block matching method, a position of blocks within the set search range is moved, and the residual difference between the blocks in each position within the search range and blocks of the current image is obtained, and the block position so as to minimize the residual difference is obtained.

In the block matching method, the problem is that the amount of operation is large. For example, if it is assumed that the size of a block is 16 pixels×16 pixels and the size of a search range is 15 pixels in longitudinal and transverse directions, respectively, and the residual difference is obtained at each integer pixel position within the search range, in order to obtain a motion vector of one block, calculations of the absolute value of 256 (=16×16) pixels of the difference have to be performed 961 (31×31) times. Further, in order to carry out this processing with respect to each block in the current image, the whole amount of operation becomes larger.

Because of this, a method of reducing the amount of operation of the block matching method is required. As the method of reducing the amount of operation, a SSDA (Sequential Similarity Detection Algorithm) method is known. This method is disclosed in, for example, DANIEL I. BARNEA, HARVEY F. SILVERMAN, "A Class of Algorithms for Fast Digital Image Registration", IEEE Transactions on Computer, Vol. C-21, No.2, pp179–186, February, 1972. This method is designed so that attention is given to the nature that the residual difference remarkably increases in blocks having a little similarity and during calculation of the residual difference, the residual difference obtained in partway is compared with a certain threshold value and if the residual difference exceeds the threshold value, the calculation of the residual difference concerning said block is aborted and thereby, the amount of operation is reduced.

In the case of using this method, it becomes a problem in setting the threshold value for determining abort of the calculation of the residual difference. If the threshold value is too large, the amount of operation becomes large since the case capable of aborting the calculation of the residual difference decreases. On the contrary, if the threshold value is too small, the global minimum value cannot be searched and thus the possibility of outputting an inadequate motion vector is increased.

As for a method of setting the threshold value, there is, for example, an automatic determination method of the threshold value disclosed in "Overlay of Image by Sequential Testing Method of Residual Difference" by Morio Onoue, Norihiko Maeda, and Masaru Saitou, Information Processing, Vol. 17, No.7, pp634–640, July, 1976. This method uses the minimum value of the past residual difference as the threshold value. According to this method, the residual difference is first calculated without setting the threshold value and the calculated residual difference is set to the first threshold value and subsequently, the calculated residual difference is set to the new threshold value whenever the calculations of the residual difference are performed until the end of the block without aborting on the way and thereby, the global minimum value can always be searched.

In the case of using this method, order of movement in calculating the residual difference by moving a block position within a search range is important. That is, if blocks having smaller residual difference at an early stage of search are processed and the residual difference may be set to the threshold value, the case capable of aborting the calculation of the residual difference increases by the SSDA method, with the result that the amount of operation may be reduced. For this purpose, for example, in Telenor Research, "TMN (H.263) Encoder/Decoder, Version 2.0", June, 1997, attention is given to the nature that the probability of occurrence of a motion vector having a small size is high, and a spiral search for starting a search from a position of a motion vector (0,0) within a search range and sequentially performing the search outwardly is used.

FIG. 15 is a block diagram illustrating a configuration example of a motion vector detecting apparatus using the spiral search. This motion vector detecting apparatus is regarded as a conventional example below.

In FIG. 15, a current image is supplied to a current image input circuit 130. Also, a reference image is inputted to a reference image input circuit 131. A search range setting circuit 132 sets a search range for motion vector detection to the reference image inputted from the reference image input circuit 131. The search range is set to, for example, the range defined by standards such as H.263, MPEG-2. Also, in order to reduce the amount of operation necessary for the motion vector detection, the search range may be set to the range narrower than the range defined by the standards. A spiral scan circuit 133 scans the inside of the search range of the reference image set by the search range setting circuit 132 in spiral order.

FIG. 16 illustrates an example of scan order of the search range by the spiral scan circuit 133. FIG. 16 is an example when the search range is three pixels in longitudinal and transverse directions, respectively, and a search is performed at integer pixel positions. In FIG. 16, circles indicate the integer pixel positions and a double circle indicates a pixel position of a motion vector (0,0) within a search range 140 and numerals written in the circles indicate order for scanning the pixel positions.

A residual difference calculation and minimum determination circuit 134 calculates the residual difference using blocks in the input image inputted from the current image input circuit 130 and blocks in the reference image scanned by the spiral scan circuit 133. Next, the calculated residual difference is compared with the minimum residual difference, and the minimum residual difference is updated if the calculated residual difference is smaller than the minimum residual difference. In this residual difference calculation and minimum determination, for example, the above-mentioned SSDA method and threshold automatic determination method are used.

FIG. 17 is a flowchart illustrating operations of the residual difference calculation and minimum determination circuit 134 using the SSDA method and threshold automatic determination method. As an initial value of the minimum residual difference, for example, the residual difference where a motion vector is (0,0) is set, and as an initial value of a motion vector, for example, a motion vector (0,0) is set. In the residual difference calculation and minimum determination, the residual difference is first initialized (step S100). Next, the residual difference concerning a part of a block is calculated and the result is added to the residual difference (step S101). Here, a part of the block means pixels such as one pixel, one row of pixels, half of the block, and must be determined by taking account of balance between the amount of operation capable of reduction by the SSDA method and the amount of operation newly caused by using the SSDA method.

Then, the intermediate result of the residual difference calculation is compared with the minimum residual difference (step S102). Here, if the intermediate result of the residual difference calculation is larger than the minimum residual difference, the residual difference calculation is aborted for termination since there is no possibility that the residual difference becomes not larger than the minimum residual difference even if the residual difference calculation is executed until the end of the block. Subsequently, it is determined whether the residual difference calculation of the whole block is terminated or not (step S103), and if not, the steps S101 and S102 are repeated. If so, the residual difference is compared with the minimum residual difference (step S104), and if the residual difference is smaller than the minimum residual difference, the minimum residual difference is updated to the current residual difference of the block and the motion vector is updated to the motion vector of the current block (step S105).

When the residual difference calculation and minimum determination is performed over the whole blocks within the search range set by the search range setting circuit 132, the motion vector of the block in which the residual difference becomes minimum is obtained, so that this motion vector is outputted from a motion vector output circuit 135.

FIG. 18 illustrates search order in the case of searching motion vectors in scan line order of a screen when scanning the inside of the search range of the reference image. Meaning etc. of reference characters indicated in FIG. 18 is similar to that indicated in FIG. 16.

On the contrary, in FIG. 16, a search is first performed from positions near a position of a motion vector (0,0)

within the search range 140 by using a spiral search. In general, the probability of occurrence of a motion vector having a smaller size is higher. Thus, by performing the spiral search, blocks having small residual difference at an early stage of the search are processed and the case capable of aborting the residual difference calculation by the SSDA method increases. As a result, the amount of operation can be reduced more.

However, in the case of using the above spiral search, the blocks having smaller residual difference at an early stage of the search cannot be processed depending on the nature of images, so that there has been a problem that the amount of operation cannot be reduced. For example, in pan manipulation etc. of a camera, the motion vectors with the size larger than several pixels of row or column direction in many part within a screen appear. In this case, many blocks having small residual difference are located toward the outside of the search range. Thus, in the spiral search for always starting a search from a position of a motion vector (0,0) and sequentially performing the search outwardly, the blocks having smaller residual difference at an early stage of the search cannot be processed, with the result that the amount of operation cannot effectively be reduced.

SUMMARY OF THE INVENTION

Object of the Invention

It is an object of the present invention to process blocks having smaller residual difference at an early stage of a search and increase the number of blocks capable of aborting calculation of the residual difference on the way and detect motion vectors in a small amount of operation without lowering detection accuracy.

Summary of the Invention

In the present invention, scan order within a search range set in a reference image is set by using information on the previous motion vectors. That is, in the present invention, by performing scanning in order adapted for the nature of images, the number of blocks capable of aborting calculation of the residual difference on the way is increased at an early stage of a search. Concretely, for example, a motion vector of a block residing in the same position as the previous frame is set as a predictive vector of the motion vector of a block of an object of processing. Then, the end position of the predictive vector is set to the scan start position and scanning is spirally performed from the scan start position toward the vicinity of the outside of the search range. As a result, in the present invention, the motion vector can be detected in a small amount of operation without lowering detection accuracy.

Also, in the present invention, a search order setting circuit sets search order using information on the motion vectors stored in a motion vector storage circuit.

Further, in the present invention, space correlation rather than time correlation in time-varying images is used for obtaining the predictive vector of the motion vector of a block of an object of processing. For example, the predictive vector of the block of an object of processing is obtained from the motion vector of the block near the same frame, and scanning is spirally performed using the end point of the predictive vector as the scan start position.

Furthermore, in the present invention, when the scan order within the search range set by a search range setting circuit is set by using the information on the motion vectors stored in the motion vector storage circuit, the search order setting circuit provides plural scan orders previously and selects one of the provided plural scan orders on the basis of the information on the motion vectors stored in the motion vector storage circuit.

DESCRIPTION OF THE PREFERRED EMBODIMENTS

Embodiments of the present invention will be described with reference to the accompanying drawings below.

A first embodiment will be first described.

Figure 1:
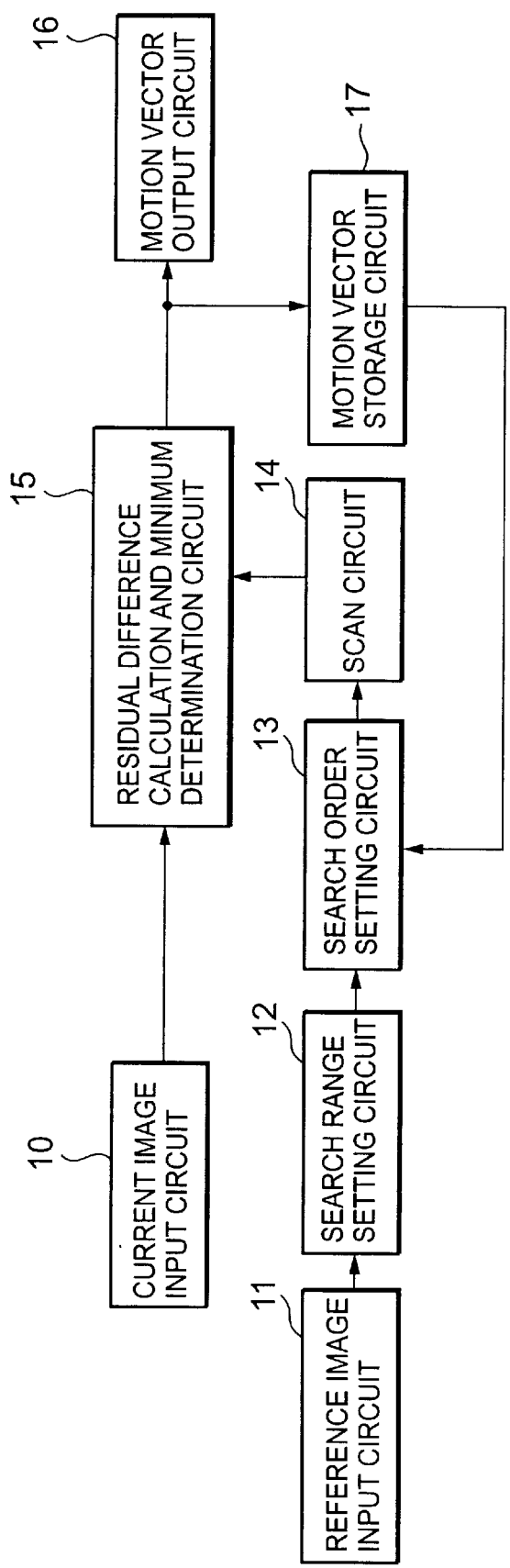
FIG. 1 is a block diagram showing a configuration of a motion vector detecting apparatus of the present invention.

FIG. 1 is a block diagram showing a configuration example of a motion vector detecting apparatus using a spiral search according to the first embodiment. This motion vector detecting apparatus comprises a current image input circuit 10, a reference image input circuit 11, a search range setting circuit 12, a search order setting circuit 13, a scan circuit 14, a residual difference calculation and minimum determination circuit 15, a motion vector output circuit 16, and a motion vector storage circuit 17.

Figure 17:
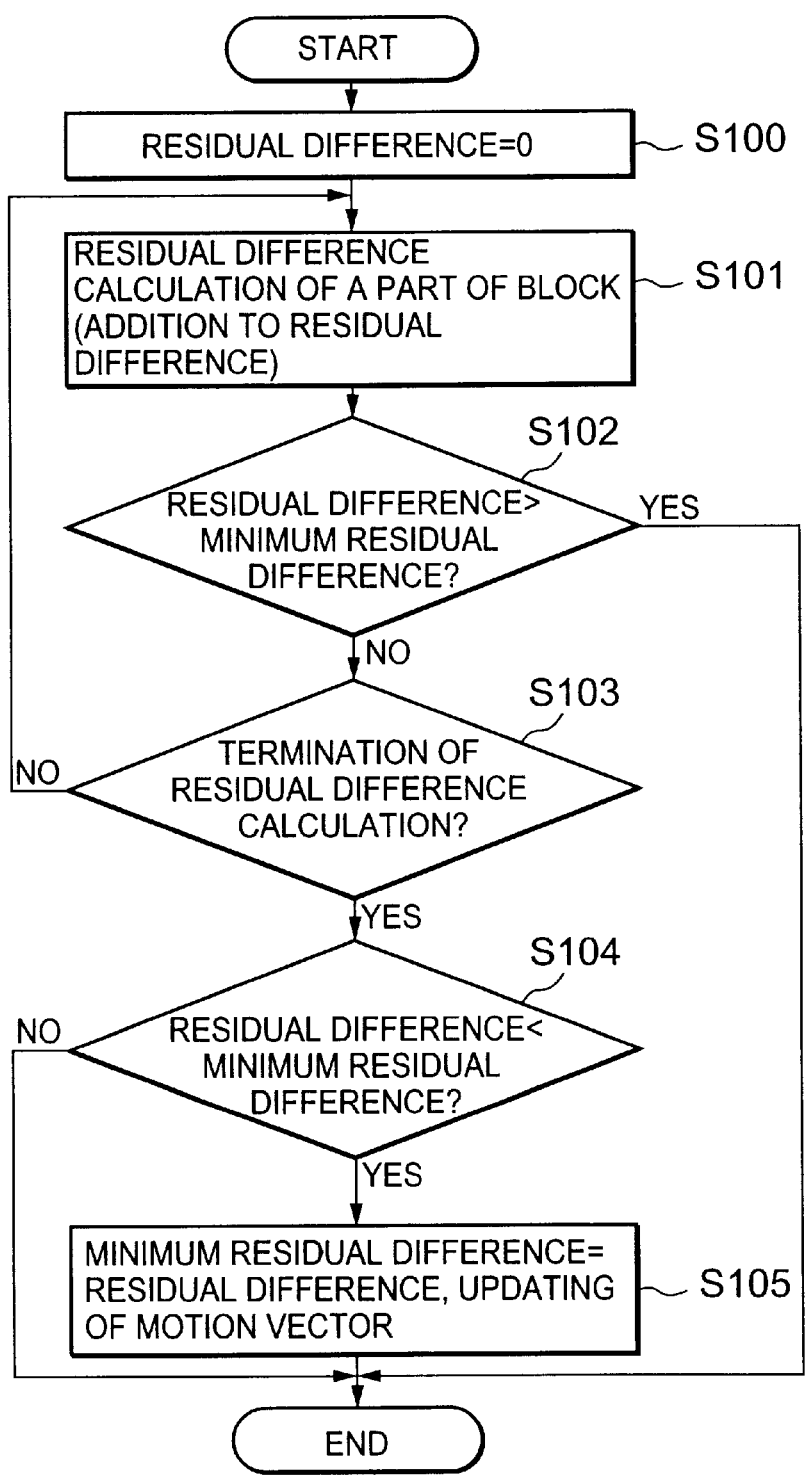
FIG. 17 is a flowchart illustrating operations of a residual difference calculation and minimum determination circuit.
Figure 18:
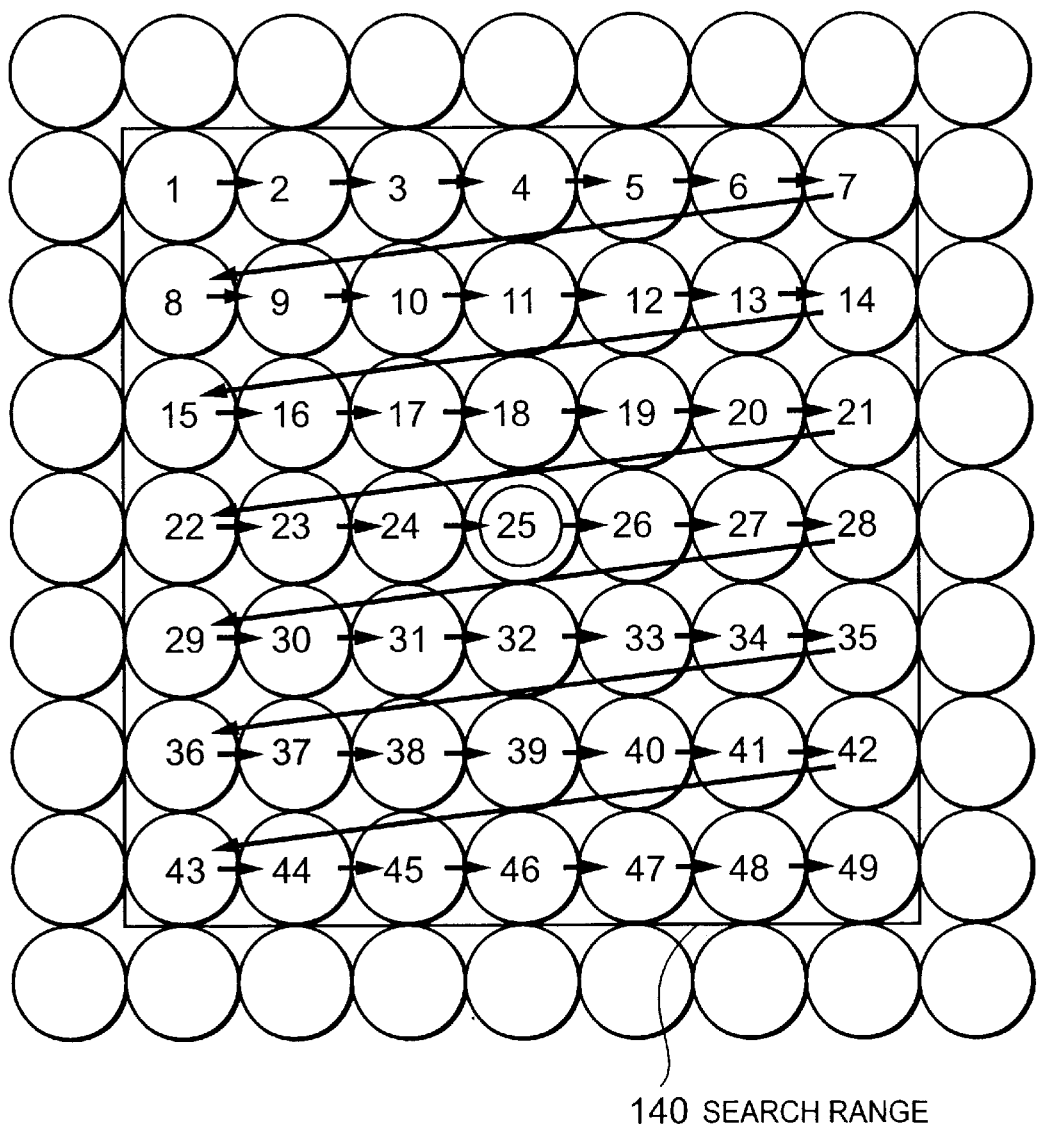
FIG. 18 is a schematic diagram illustrating an example of scan order of a search range by a search of scan line order.

In FIG. 1, a current image is supplied to the current image input circuit 10. Also, a reference image is inputted to the reference image input circuit 11. The search range setting circuit 12 sets a search range for detecting motion vectors to the reference image inputted from the reference image input circuit 11. The search range is set to, for example, the range defined by standards such as H.263, MPEG-2. Also, in order to reduce the amount of operation necessary for the motion vector detection, the search range may be set to the range narrower than the range defined by the standards. The motion vector storage circuit 17 stores the motion vectors detected up to the present. The search order setting circuit 13 sets scan order within the search range set by the search range setting circuit 12 using information on the motion vectors stored in the motion vector storage circuit 17. The scan circuit 14 scans the inside of the search range of the reference image in order set by the search order setting circuit 13. The residual difference calculation and minimum determination circuit 15 calculates the residual difference using blocks in the input image inputted from the current image input circuit 10 and blocks in the reference image scanned by the scan circuit 14, and the calculated residual difference is compared with the minimum residual difference, and the minimum residual difference is set to the calculated residual difference if the residual difference is smaller than the minimum residual difference. That is, the minimum residual difference is sequentially updated. In this residual difference calculation and minimum determination, or example, the above-mentioned SSDA method and threshold automatic determination method are used. Operations of the residual difference calculation and minimum determination circuit 15 are similar to the operations of the residual difference calculation and minimum determination circuit 134 of the conventional motion vector detecting apparatus shown in FIG. 17. When the residual difference calculation and minimum determination is performed over the whole blocks within the search range set by the search range setting circuit 12, the motion vector of the block in which the residual difference becomes minimum is obtained, so that this motion vector is outputted from a motion vector output circuit 16 and is also stored in the motion vector storage circuit 17.

The search order setting circuit 13 sets search order using information on the motion vectors stored in the motion vector storage circuit 17. Concretely, for example, a vector of the motion vector detection result of a block residing in the same position as the previous frame is set as a predictive vector of the motion vector of a block of a processing object. Then, the end position of the predictive vector is set to the scan start position and scanning is spirally performed from the scan start position toward the vicinity of the outside of the search range.

Figure 2:
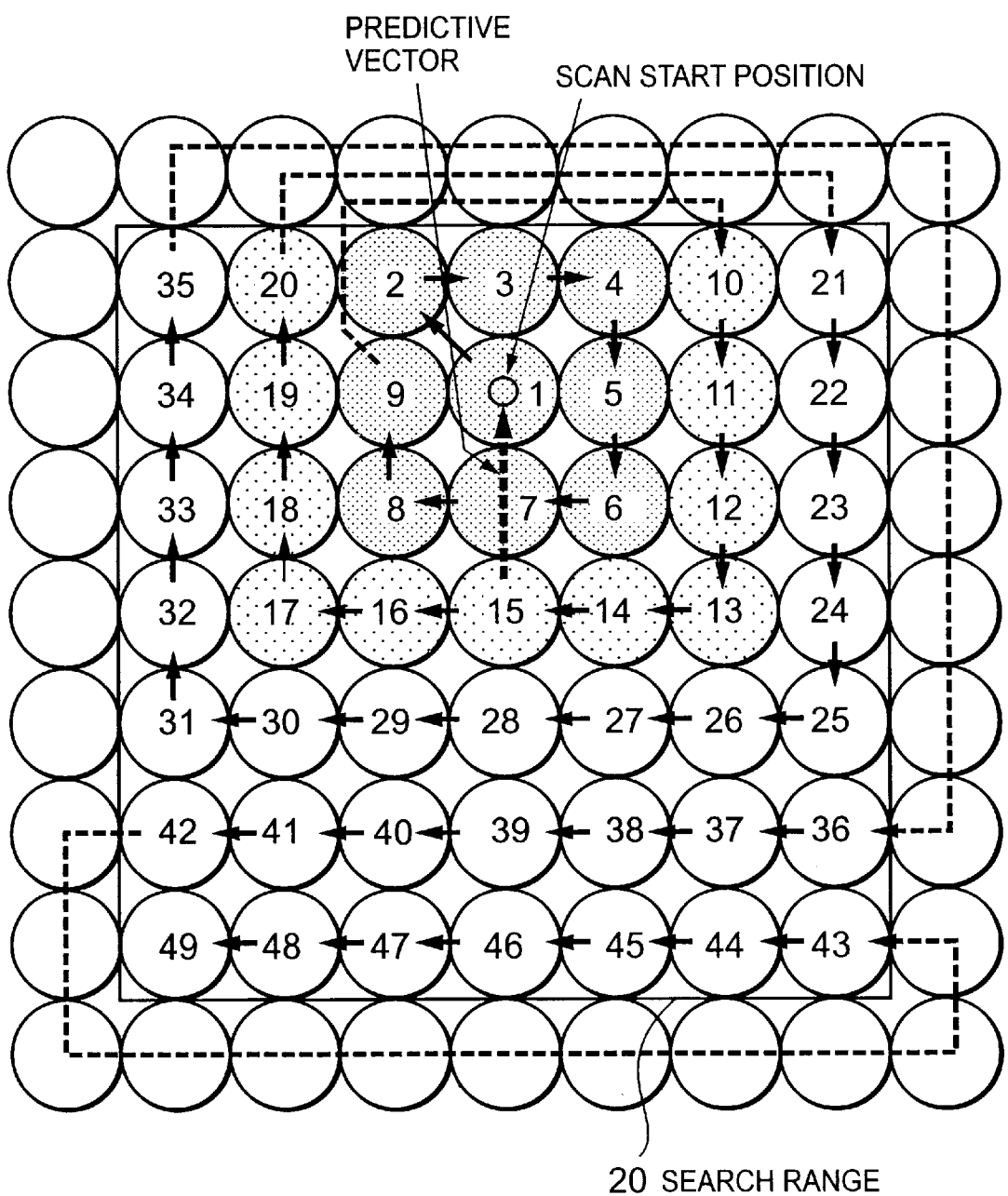
FIG. 2 is a schematic diagram illustrating an example of scan order of a search range in the present invention.

FIG. 2 is a schematic diagram showing one example of search order by the above search order setting circuit. Meaning etc. of reference characters of FIG. 2 is similar to that of FIG. 16. FIG. 2 is an example in the case that a search range is three pixels in longitudinal and transverse directions, respectively, and a search is performed at integer pixel positions and a predictive vector obtained from the motion vector of a block residing in the same position as the previous frame was upward two pixels in size. In FIG. 2, deep half-tone dot meshing positions (in the example of FIG. 2, positions scanned in the first to the ninth) are scanned at a particularly early stage of the search, and light half-tone dot meshing positions (in the example of FIG. 2, positions scanned in the tenth to the twentieth) are scanned at the next early stage, and the other positions are scanned after scanning of the half-tone dot meshing positions.

Since there is time correlation in time-varying images, the possibility that the motion vector having the same direction and size as the motion vector of the previous frame appears is large. Thus, by setting the motion vector of the previous frame as a predictive vector and performing scanning in spiral form using the end position of the predictive vector within a search range 20 as the scan start position, the blocks having the small residual difference at an early stage of the scanning can be processed. As a result, the number of blocks capable of aborting calculation of the residual difference on the way can be increased.

Also, for obtaining the predictive vector of the motion vector of a block of a processing object, space correlation may be used rather than the time correlation in time-varying images as described above. For example, the predictive vector of the block of the processing object may be obtained from the motion vector of the block near the same frame to perform the scanning in spiral form using the end position of the predictive vector as the scan start position.

Figure 3:
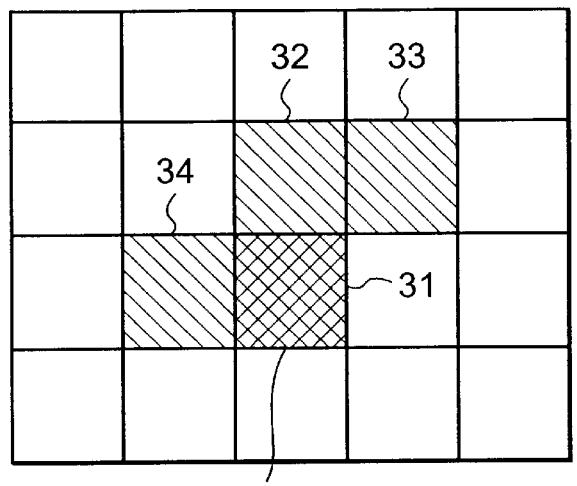
FIG. 3 is a schematic diagram illustrating an example of prediction of motion vectors in the present invention.

FIG. 3 is a schematic diagram showing one example of motion vector prediction. In FIG. 3, for example, a median value of motion vectors of blocks 32 to 34 in the vicinity of completion of motion vector detection already is set to a predictive vector of a block 31 of an object of processing.

Since there is space correlation in images, the possibility that the motion vector having the direction and size similar to that of the motion vector of neighboring blocks appears is large. Thus, by performing scanning in spiral form using the end position of the predictive vector obtained as described above as the scan start position, the blocks having the small residual difference at an early stage of the scanning can be processed, with the result that the number of blocks capable of aborting calculation of the residual difference on the way can be increased.

Moreover, using both of the time and space correlation in time-varying images, the predictive vector can be obtained. Also, using the motion vectors of the farther distant frame or block as well as the directly previous frame or the directly neighboring block, the search order can be set.

In the conventional motion vector detecting apparatus, since scan order within a search range set in a reference image was constant, blocks having the small residual difference at an early stage of scanning could not be processed depending on the nature of images, with the result that the amount of operation could not be reduced effectively. On the contrary, according to the present embodiment, the scan order within the search range set in the reference image is determined using information on the motion vectors detected up to the present. This means that scanning is performed in the order adapted for the nature of images. According to the present embodiment, the blocks having the small residual difference at an early stage of scanning are processed, so that the number of blocks capable of aborting calculation of the residual difference on the way can be increased. Such the number of blocks can be increased, with the result that the amount of operation necessary for motion vector detection can be reduced. That is, the vector detection can be performed in a small amount of operation without lowering detection accuracy.

Next, a second embodiment will be described. A configuration of a motion vector detecting apparatus according to the second embodiment is similar to that of FIG. 1. Though the example of performing the scanning in spiral form using the end point of the predictive vector as the scan start position is indicated in the first embodiment, a setting example of another scan order will be described in the second embodiment. In the present embodiment, scan order is determined using an evaluation value s.

Figure 4:
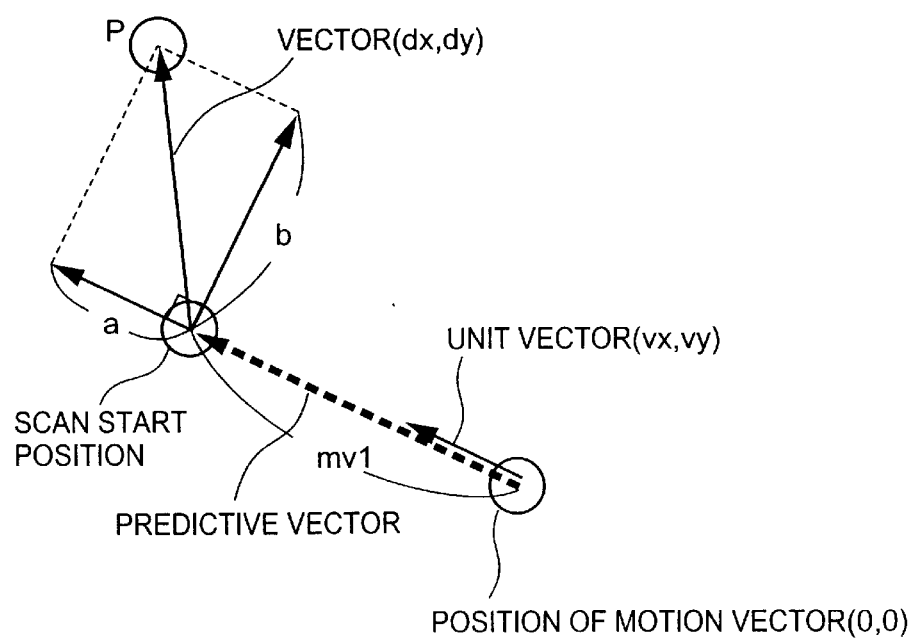
FIG. 4 is a schematic diagram illustrating an example of a determination method of an evaluation value for setting the scan order in the present invention.
Figure 5:
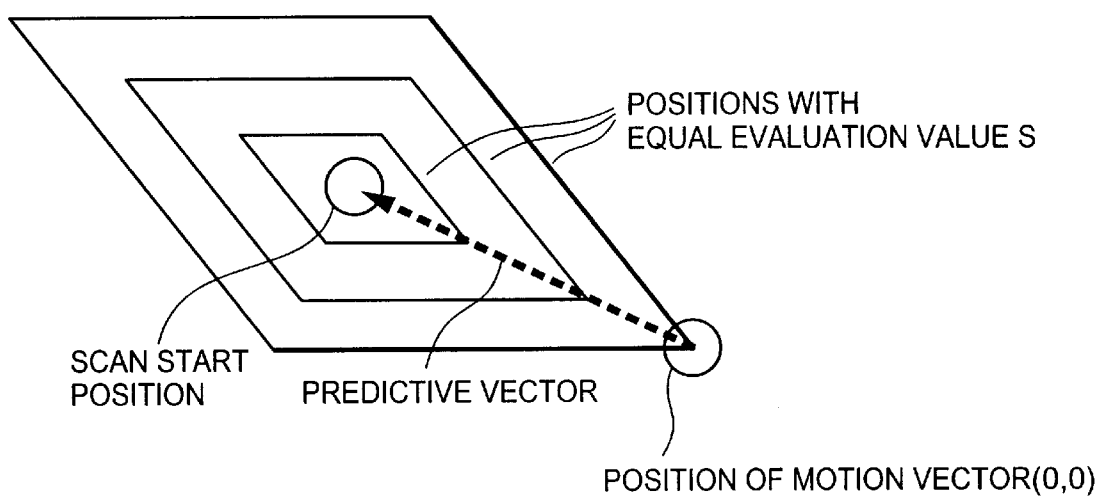
FIG. 5 is a schematic diagram illustrating an example of the scan order setting on the basis of the evaluation value in the present invention.

FIGS. 4 and 5 are schematic diagrams illustrating an example of a determination method of the evaluation value s in the second embodiment.

In FIG. 4, a vector (vx, vy) is a unit vector with the same direction as the predictive vector of the processing object obtained by the same manner as described in the first embodiment, and mv1 is the size of the predictive vector. That is, the predictive vector is indicated by a vector (mv1×vx, mv1×vy). A vector (dx, dy) is a scan start position, namely, the vector directed to an arbitrary search position P within a search range from the end point of the predictive vector. Here, in order to obtain an evaluation value s for setting scan order of the search position P, the vector (dx, dy) is decomposed into a vector parallel to the vector (vx, vy) and a vector perpendicular to the vector (vx, vy), and the sizes of the respective vectors are a and b. In this case, the a and b, respectively, are represented as follows.

a=|vx×dx+vy×dy| b=|−vy×dx+vx×dy|

The evaluation value s is obtained by s=a/(1+(mv1/4))+b using the a and b.

Then, the scanning is performed sequentially from the search position with the small evaluation value s out of each search position within the search range.

Figure 6:
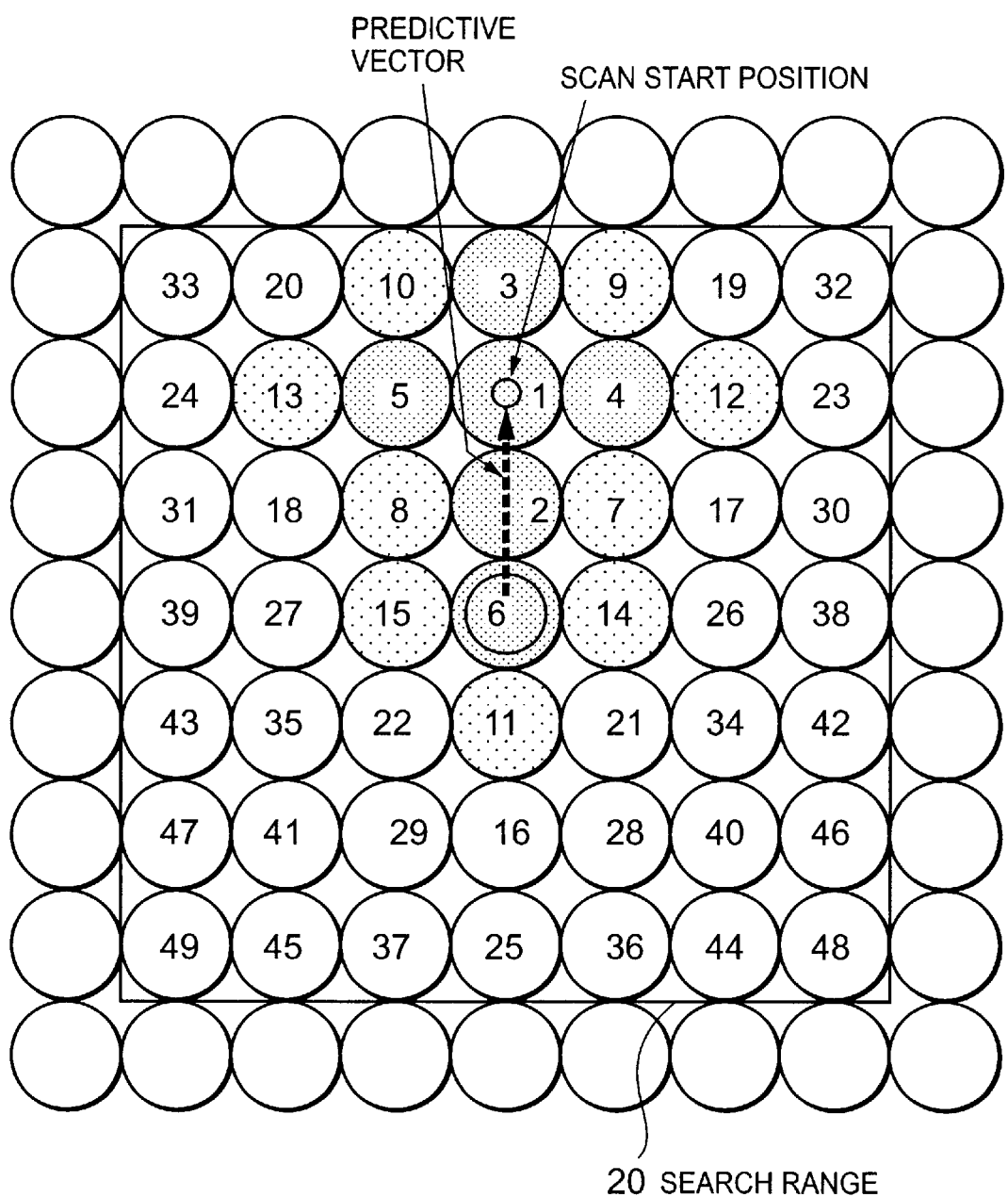
FIG. 6 is a schematic diagram illustrating another example of scan order of a search range in the present invention.

For the search positions with the equal evaluation value s, for example, the search position with the larger longitudinal coordinate value is first scanned, and if the longitudinal coordinate value is also equal, the search position with the larger transverse coordinate value is first scanned. In the setting of search order on the basis of the above evaluation value s, the scanning is sequentially performed from the scan start position as shown in FIG. 5. That is, the scanning is sequentially performed from the search position within the smaller rhombic area of similar rhombic areas having a major axis in a direction of the predictive vector with the end point of the predictive vector centered. FIG. 6 is a schematic diagram illustrating one example of search order set on the basis of the above evaluation value s. Meaning etc. of reference characters of FIG. 6 is similar to that of FIG. 2. FIG. 6, similar to the example of FIG. 16, is an example in the case that a search range is three pixels in longitudinal and transverse directions, respectively, and a search is performed at integer pixel positions and a predictive vector was upward two pixels in size.

Figure 16:
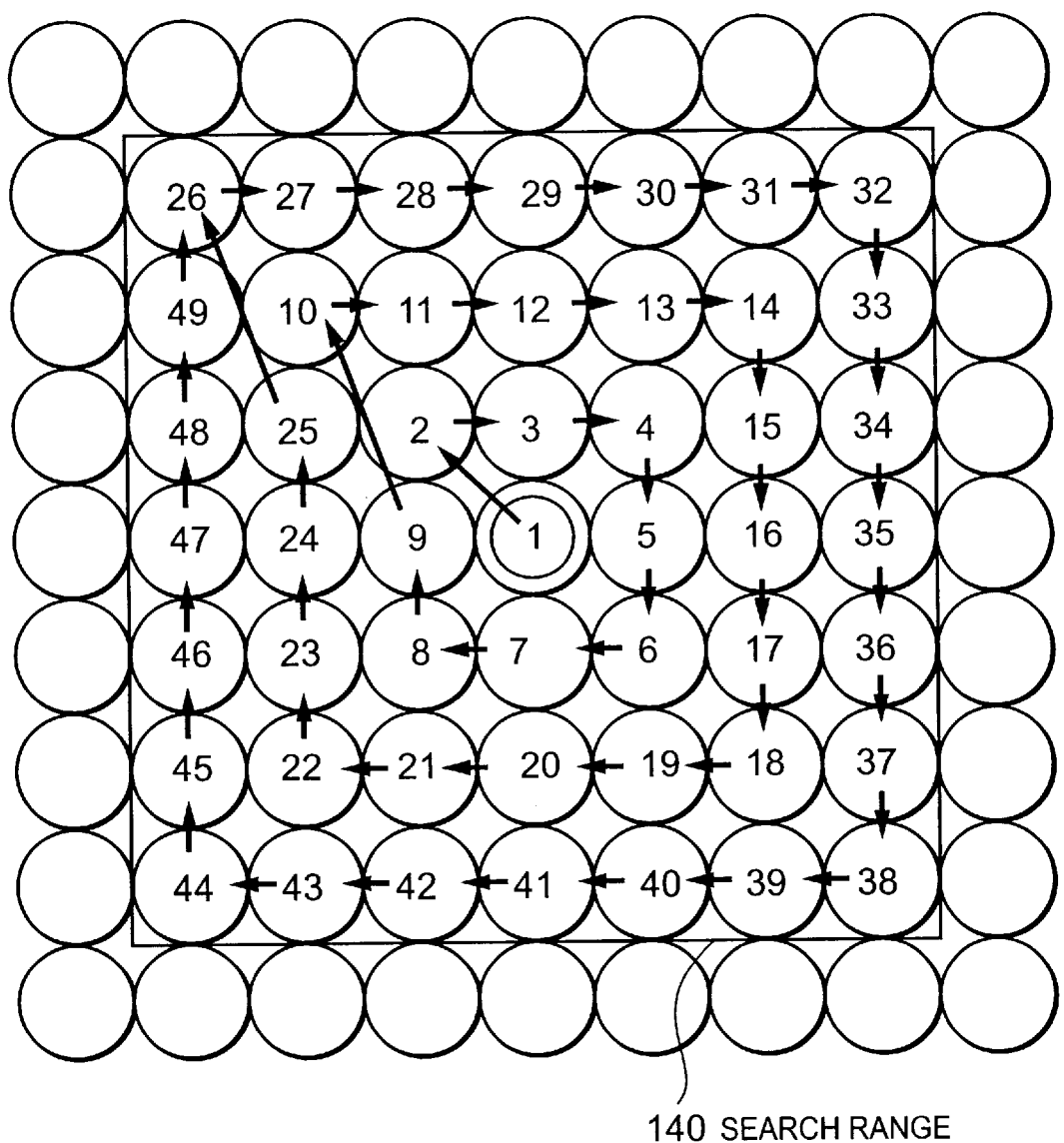
FIG. 16 is a schematic diagram illustrating an example of scan order of a search range by a spiral search.

By comparison between FIG. 16 and FIG. 6, in the example of FIG. 6, a search of positions along the longitudinal axis extending through the position of a motion vector (0,0) is first performed.

Figure 7:
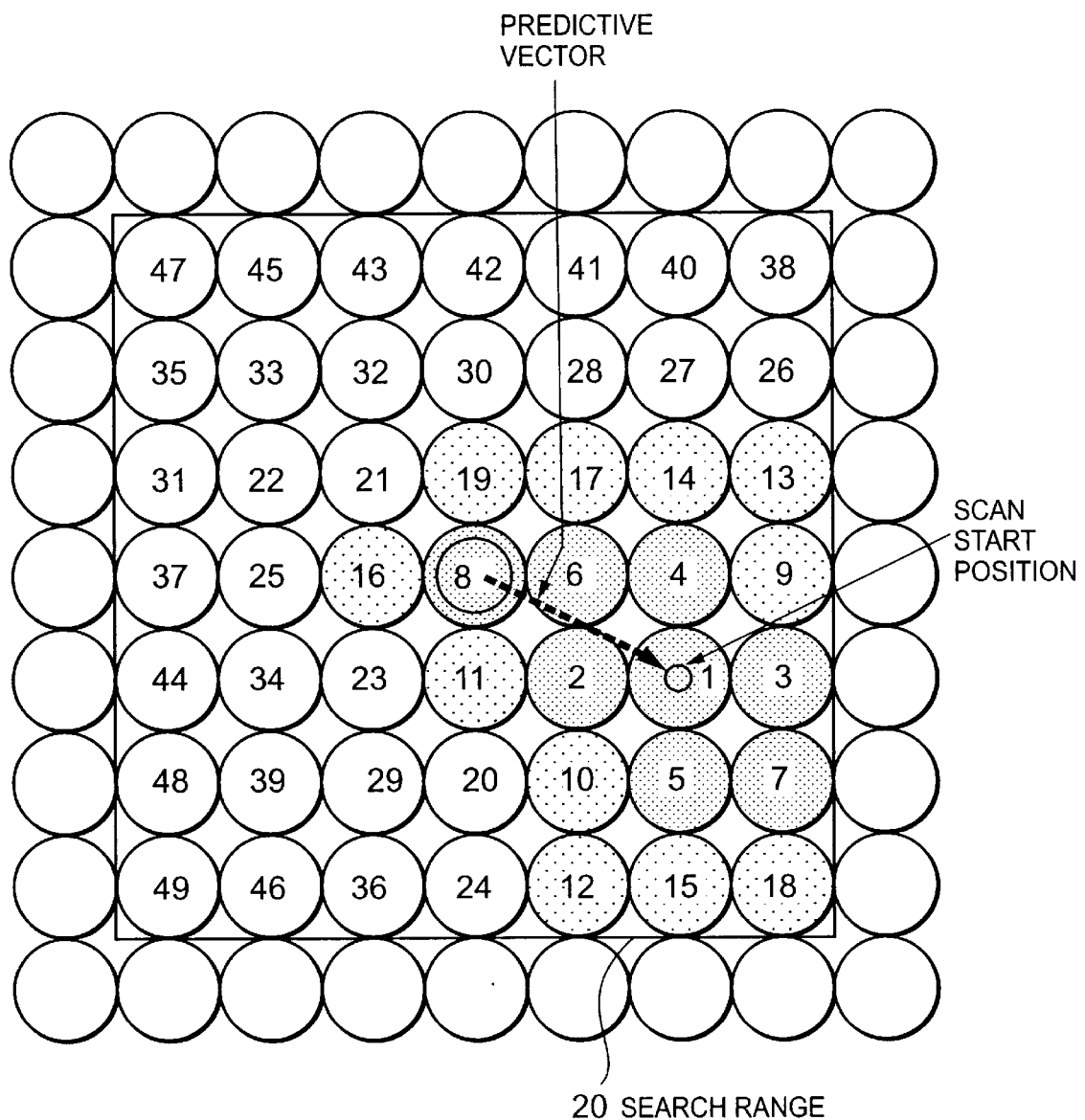
FIG. 7 is a schematic diagram illustrating a further example of scan order of a search range in the present invention.

FIG. 7 is a schematic diagram illustrating another example of search order by the search order setting circuit of the motion vector detecting apparatus according to the second embodiment. Meaning etc. of reference characters of FIG. 7 is similar to that of FIG. 2. FIG. 7 is similar to the example of FIG. 6 in the search range and search accuracy, but is an example in the case that a predictive vector was rightward two pixels and downward one pixel in size.

Figure 8:
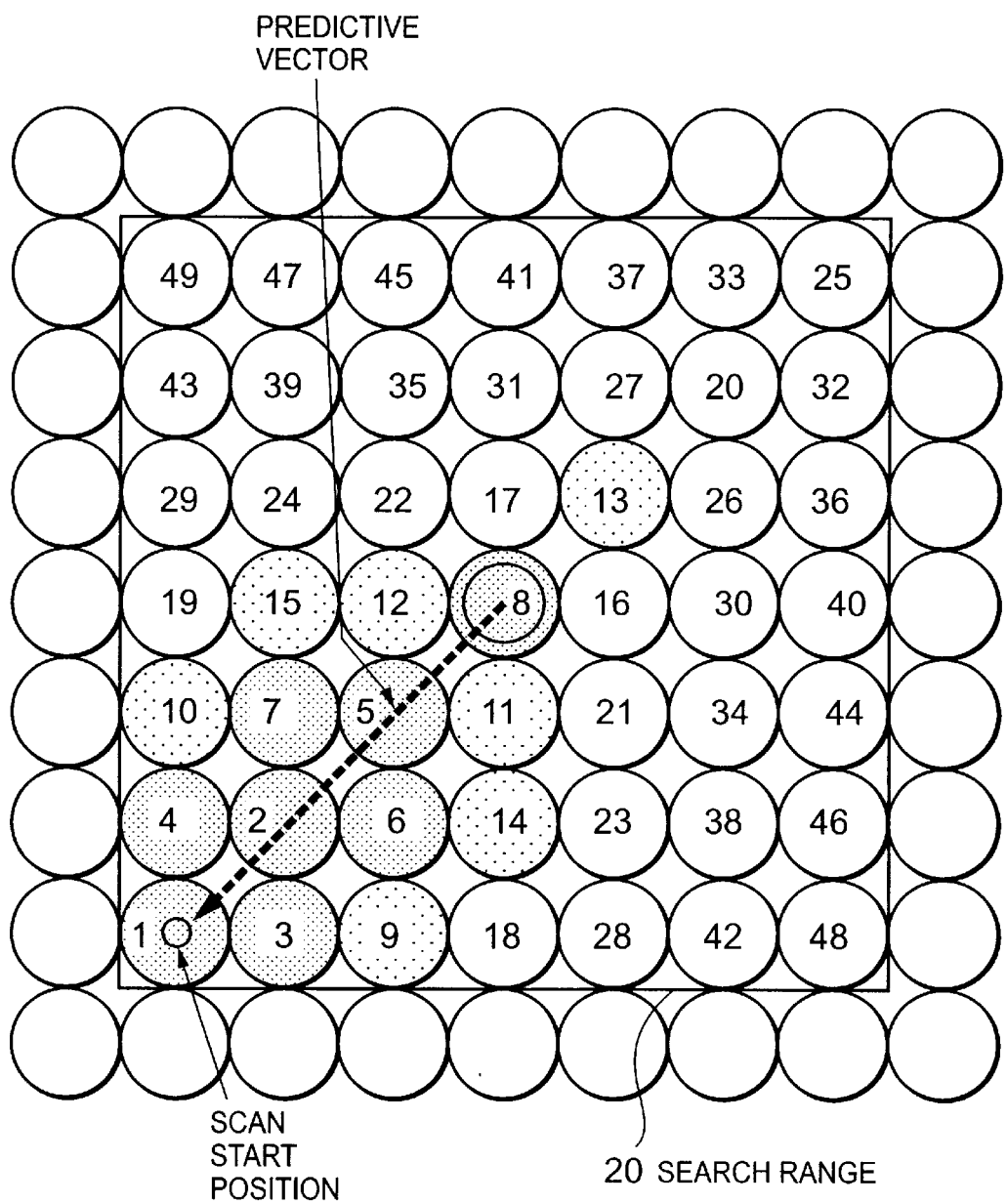
FIG. 8 is a schematic diagram illustrating still a further example of scan order of a search range in the present invention.

FIG. 8 a schematic diagram illustrating a further example of search order by the search order setting circuit of the motion vector detecting apparatus according to the second embodiment. Meaning etc. of reference characters of FIG. 8 is similar to that of FIG. 2. FIG. 8 is similar to the example of FIG. 6 in the search range and search accuracy, but is an example in the case that a predictive vector was leftward three pixels and downward three pixels in size.

By comparison between FIG. 16 and FIGS. 7 and 8, in the example of FIGS. 7 and 8, a search of positions along the direction of the predictive vector extending through the position of a motion vector (0,0) is first performed.

For example, in the case of pan manipulation etc. of a camera, since there is time correlation in time-varying images, the possibility that the motion vector having the different size in the same direction as the motion vector of the previous frame appears is large. Thus, by setting the motion vector of the previous frame as a predictive vector and performing priority scanning from the positions along the direction of the predictive vector using the end position of the predictive vector within a search range 20 as the scan start position, the blocks having the small residual difference at an early stage of the scanning can be processed, with the result that the number of blocks capable of aborting calculation of the residual difference on the way can be increased.

Also, in the same manner as the first embodiment, using space correlation or both of time and space of correlation in time-varying images, the predictive vector may be obtained to set the search order.

In the present embodiment, also, information on the motion vectors detected up to the present is used. Particularly, by setting the scan order so as to perform priority scanning of the specific position and direction on the basis of the size and direction of the motion vectors detected up to the present, the scanning is performed in the order adapted for the nature of images. The scanning is performed in this order, so that the blocks having the small residual difference at an early stage of the scanning can be processed. By this, the number of blocks capable of aborting calculation of the residual difference on the way is increased, so that the amount of operation necessary for motion vector detection can be reduced. Thus, the motion vector detection can be performed in a small amount of operation without lowering detection accuracy.

Then, a third embodiment will be described. A configuration of a motion vector detecting apparatus according to the third embodiment is similar to that of FIG. 1. But, in the third embodiment, when scan order of a search range set by the search range setting circuit 12 is set by the search order setting circuit 13 using information on motion vectors stored in the motion vector storage circuit 17, plural scan orders are previously provided, and one of the provided plural scan orders is selected on the basis of the information on the motion vectors stored in the motion vector storage circuit 17.

Figure 9:
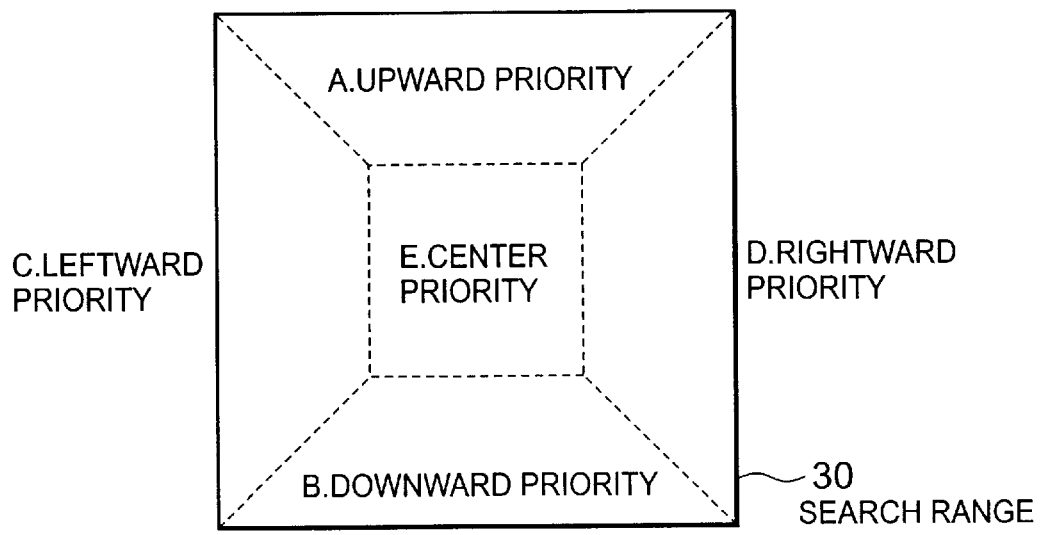
FIG. 9 is a schematic diagram illustrating an example of selection of scan orders of a search range in the present invention.

FIG. 9 is a schematic diagram illustrating an example of selection of the scan orders in the third embodiment. FIG. 9 indicates the example of dividing a search range 30 into five areas and selecting from five scan orders. Concretely, the end position of a predictive vector of a processing object obtained in the same manner as the above-mentioned first embodiment is set to the scan start position and scan order is selected according to which area of FIG. 9 the scan start position resides in. As the scan order provided previously, for example, the spiral scan order similar to the conventional example of FIG. 16 is used in area B (center priority) of FIG. 9 and the scan order etc. of FIG. 2 is used in area A (upward priority).

Figure 10:
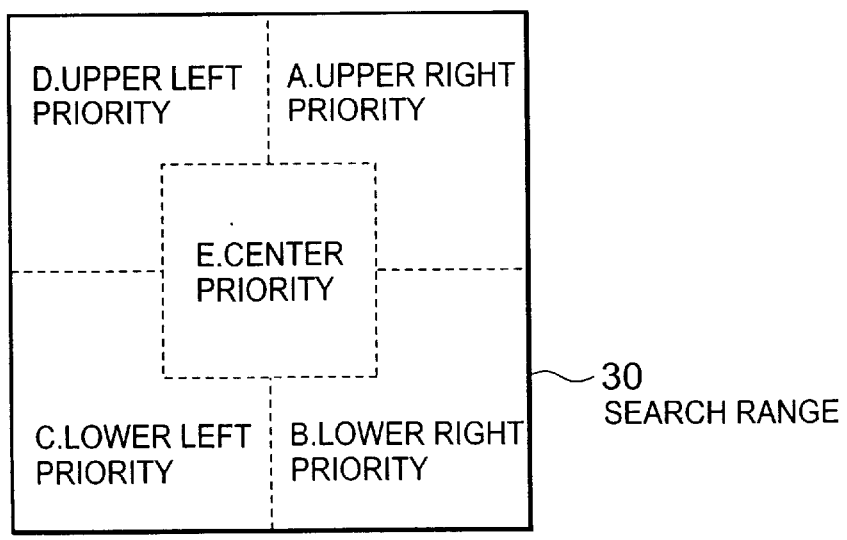
FIG. 10 is a schematic diagram illustrating another example of selection of scan order of a search range in the present invention.

Here, the scan orders provided previously and a selection method of the scan orders are not limited to the above-mentioned example and, for example, the search range may be divided into the form as shown in FIG. 10. Also, a variety of methods of obtaining the predictive vector used as decision data of the selection of the scan orders may be used in the same manner as the above-mentioned the first embodiment.

In the present embodiment, also, information on the motion vectors detected up to the present is used. Particularly, by selecting the scan order within the search range set by the reference image from the previously provided plural scan orders, the scanning can be performed in the order adapted for the nature of images. Thus, the same effect as the second embodiment can be obtained.

Further, a fourth embodiment will be described. A configuration of a motion vector detecting apparatus and operations of a search order setting circuit 13 according to the fourth embodiment is similar to the third embodiment. Though the example of selecting the spiral-shaped scanning shown in FIGS. 2 and 16 is indicated in the third embodiment, an example of selecting another scan order will be described in the fourth embodiment.

Figure 11:
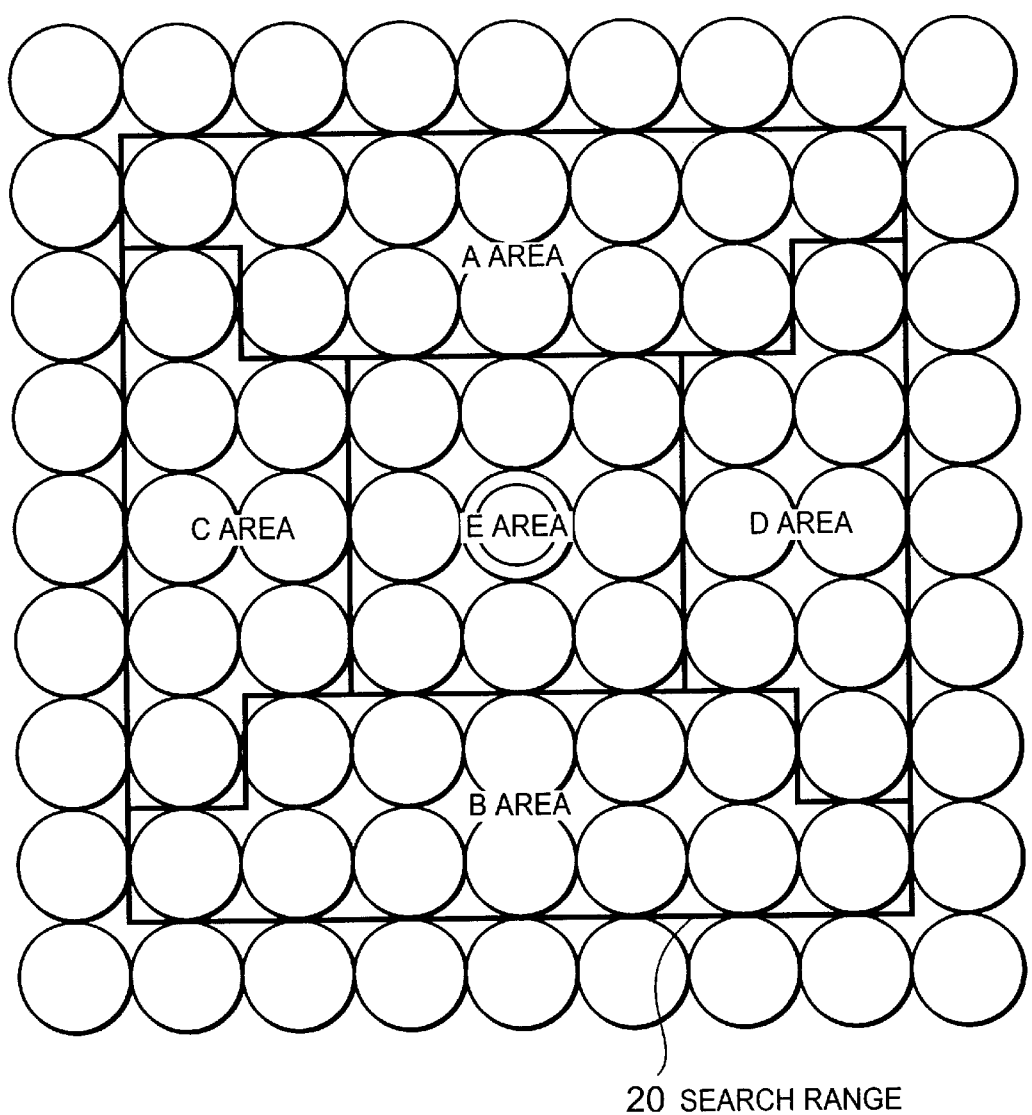
FIG. 11 is a schematic diagram illustrating an example of a setting of a search range in the present invention.

FIG. 11 is a schematic diagram illustrating one example of search range division for selecting scan order in the case that a search range is three pixels in longitudinal and transverse directions, respectively, in the same manner as the example of FIG. 16.

Figure 12:
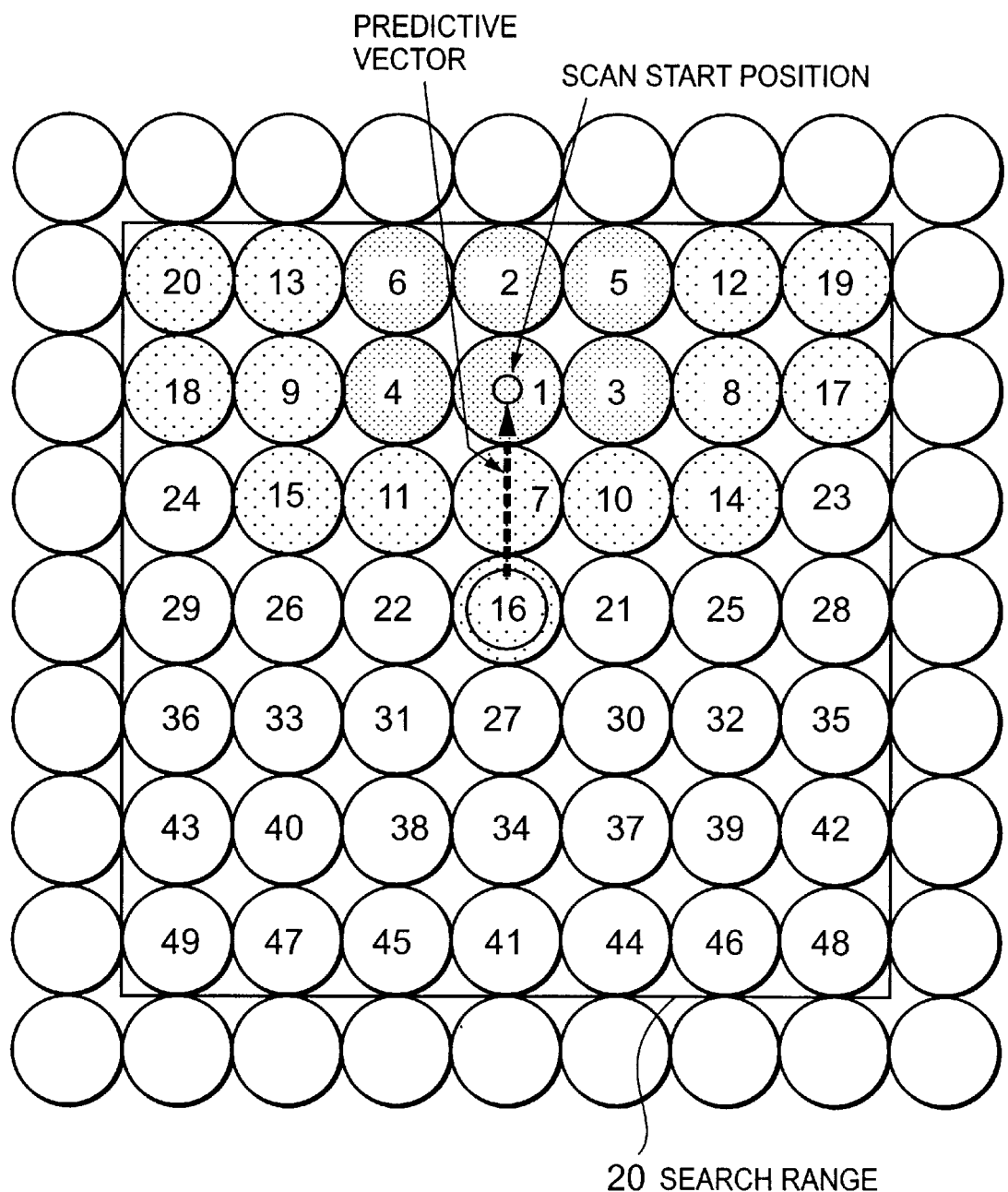
FIG. 12 is a schematic diagram illustrating additional example of scan order of a search range in the present invention.
Figure 13:
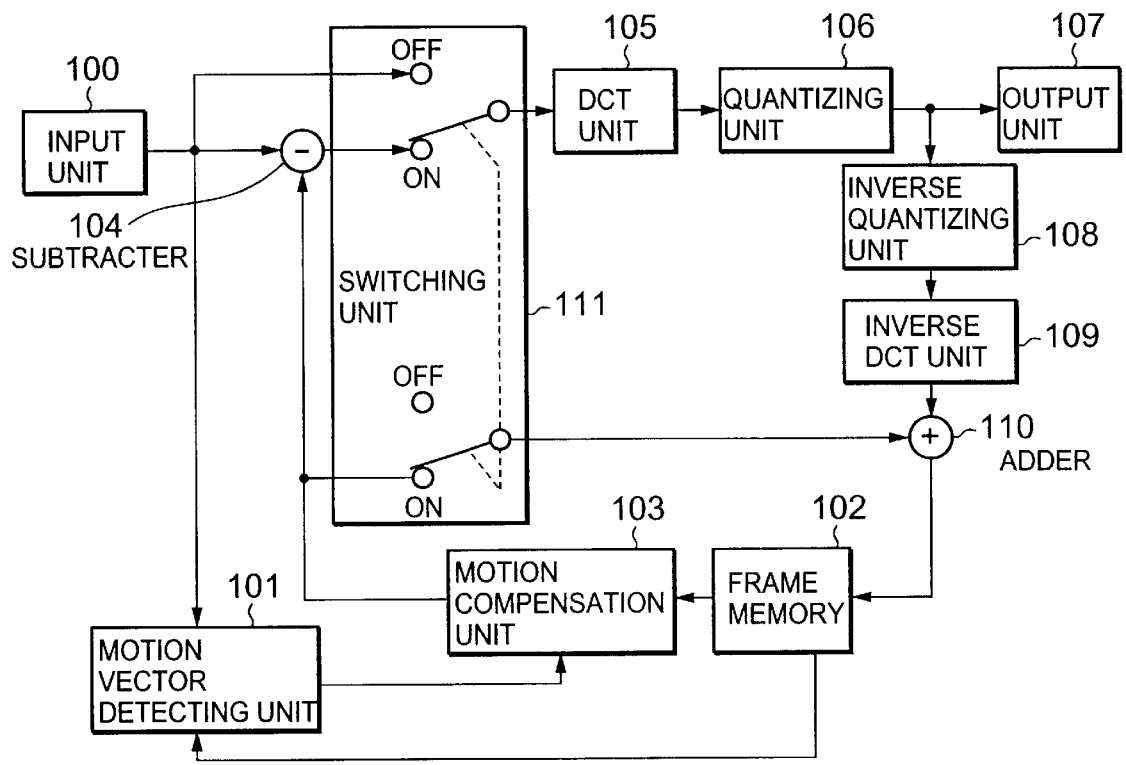
FIG. 13 is a block diagram showing a configuration example of a predictive coding apparatus using inter-frame prediction.
Figure 14:
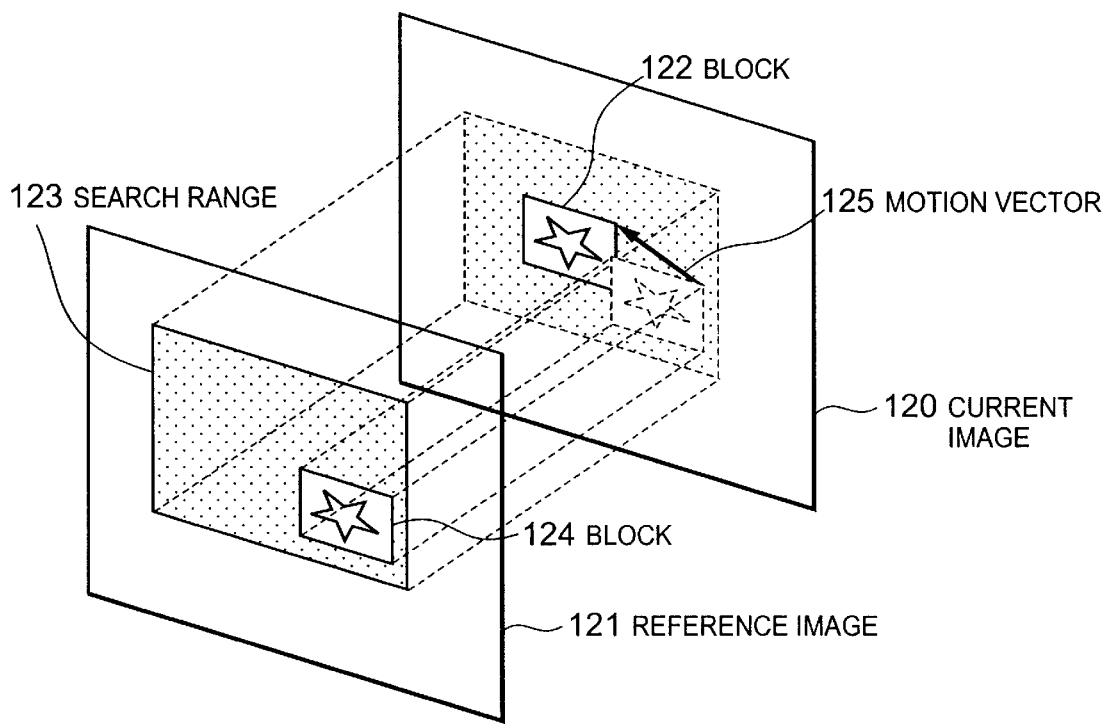
FIG. 14 is a schematic diagram illustrating motion vector detection used in compression coding.
Figure 15:
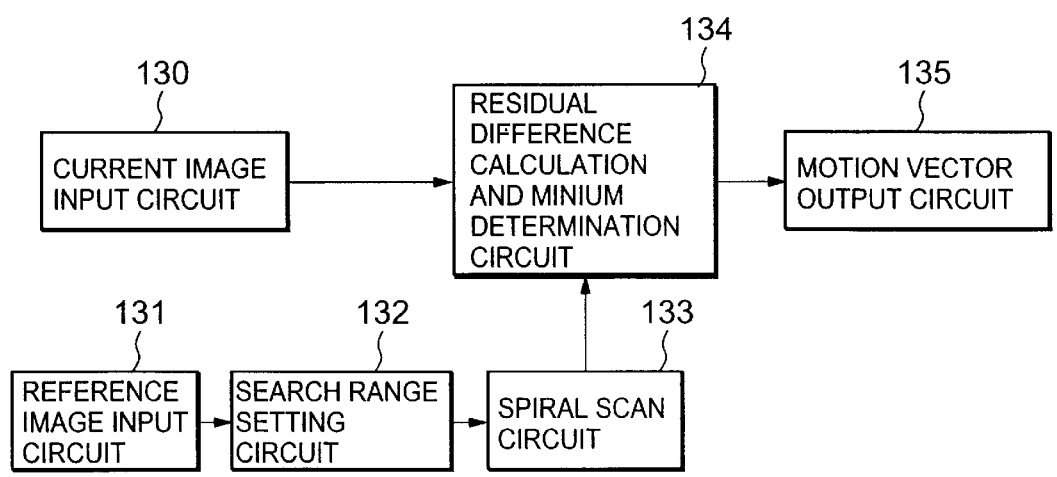
FIG. 15 is a block diagram showing a configuration of a conventional motion vector detecting apparatus.

FIG. 12 is a schematic diagram illustrating one example of the previously provided scan order selected by the above-mentioned search order setting. Meaning etc. of reference characters of FIG. 12 is similar to that of FIG. 2.

FIG. 12 is the case that a search range is three pixels in longitudinal and transverse directions, respectively, and a search is performed at integer pixel positions in the same manner as the example of FIG. 16. A predictive vector is obtained in the same manner as the above-mentioned first embodiment. The predictive vector has upward two pixels in size. Also, the end position of the predictive vector resides in an area A (upward priority) of FIG. 11.

By comparison between FIG. 16 and FIG. 12, in the example of FIG. 12, a search of positions in the upper half area within the search range is first performed.

Since there is time correlation in time-varying images, there is large possibility that the motion vector whose end position resides in the same area as the inside of the search range also appears when the end position of the motion vector of the previous frame resides in the area A of the search range division shown in FIG. 9. Thus, by performing priority scanning from the positions in the upper half area within a search range 20, the blocks having the small residual difference at an early stage of the scanning can be processed. As a result, the number of blocks capable of aborting calculation of the residual difference on the way can be increased.

In the present embodiment, also, information on the motion vectors detected up to the present is used. Particularly, the scan order so as to perform priority scanning of the specific position and direction from the previously provided plural scan orders is selected on the basis of the size and direction of the motion vectors detected up to the present. Thus, the same effect as the second embodiment can be obtained.

Although embodiments of the present invention concerning the case of using the total of absolute value of the difference of each pixel within blocks as an evaluation value of matching between the blocks have been described above, the evaluation value of matching is not limited to this, and, for example, the total of square of the difference of each pixel within blocks, etc. may be used.

Also, the case of using the threshold automatic determination method disclosed in the above documents as threshold setting of the SSDA method has been described, but the threshold setting method is not limited to this.

Further, the case of scanning each integer pixel position within set search range has been described, but the scanning method is not limited to this and, for example, the scanning may be performed at each half-pixel position or every two pixels.

Moreover, shapes and areas of a block or shapes and areas of a search range etc. when searching motion vectors may be set arbitrarily.

What is claimed is:

1. A motion vector detecting apparatus comprising:
    a current image input circuit for receiving a current image;
    a reference image input circuit for receiving a reference image;
    a search range setting circuit for setting a search range for motion vector detection within the reference image;
    a motion vector storage circuit for storing a previously determined motion vector;
    a search order setting circuit for setting an order for scanning the inside of the search range;
    a scan circuit for scanning the inside of the search range according to the order; and
    a motion vector output circuit for obtaining a motion vector from a block of the current image and a block of positions in the reference image scanned by the scan circuit;
    wherein the search order setting circuit sets the search order on the basis of the previously determined motion vector.

2. A motion vector detecting apparatus as defined in claim 1, wherein the search order setting circuit defines a priority scanning of a specific position or direction determined on the basis of the size and direction of the previously determined motion vector.

3. A motion vector detecting apparatus as defined in claim 1, wherein:
    the apparatus detects a motion vector for a current block in a current frame; and
    the scan circuit performs scanning spirally from the end position of the motion vector of a previous block residing in the same position in a previous frame as the current block in the current frame and spiraling toward the outside of the search range.

4. A motion vector detecting apparatus as defined in claim 1, wherein:
    the apparatus detects a motion vector for a current block in a current frame;
    the scan circuit performs scanning spirally from the end position of the motion vector of a block near the current block and spiraling toward the outside of the search range.

5. A motion vector detecting apparatus as defined in claim 1, wherein the scan circuit performs priority scanning of positions along the direction of the previously determined motion vector.

6. A motion vector detecting apparatus as defined in claim 1, wherein the search order setting circuit selects a particular scan order from a plurality of scan orders on the basis of the previously determined motion vector.

7. A motion vector detecting apparatus as defined in claim 1, wherein the search order setting circuit selects a particular scan order for performing priority scanning of a specific position or direction from a plurality of scan orders on the basis of the size and direction of the previously determined motion vector.

8. A motion vector detecting apparatus as defined in claim 1, wherein the search range is divided into a plurality of areas and a respective scan order is defined for each area.

9. A method for detecting a motion vector between a current image and a reference image, comprising the steps of:

setting a search range for motion vector detection within the reference image;

determining an order for scanning the inside of the search range on the basis of a previously determined motion vector; and detecting a current motion vector by scanning the inside of the search range according to the order.

10. A motion vector detecting method as defined in claim 9, wherein the order includes priority scanning of a specific position or direction determined on the basis of the size and direction of the previously determined vector.

11. A motion vector detecting method as defined in claim 9, wherein:

the detecting includes detecting a motion vector for a current block in a current frame by spirally scanning from the end position of the motion vector of a previous block in the same position in a previous frame as the current block in the current frame and spiraling toward the outside of the search range.

12. A motion vector detecting method as defined in claim 9, wherein:

the detecting includes detecting a motion vector for a current block in a current frame by spirally scanning from the end position of the motion vector of a previous block near the current block and spiraling toward the outside of the search range.

13. A motion vector detecting method as defined in claim 9, wherein the order for scanning is selected so as to prioritize scanning of the positions along the direction of the previously determined motion vector.

14. A motion vector detecting method as defined in claim 9, wherein the search range is divided into a plurality of areas and a respective scan order is defined for each area.

15. A computer readable storage medium including a program for detecting a motion vector between a current image and a reference image the program comprising the steps of:

setting a search range for motion vector detection within the reference image;

determining an order for scanning the inside of the search range on the basis of a previously determined motion vector; and detecting a current motion vector by scanning the inside of the search range according to the order.

16. A storage medium as defined in claim 15, wherein the order includes priority scanning of a specific position or direction determined on the basis of the size and direction of the previously determined vector.

17. A storage medium as defined in claim 15, wherein:

the detecting includes detecting a motion vector for a current block in a current frame by spirally scanning from the end position of the motion vector of a previous block in the same position in a previous frame as the current block in the current frame and spiraling toward the outside of the search range.

18. A storage medium as defined in claim 15, wherein:

the detecting includes detecting a motion vector for a current block in a current frame by spirally scanning from the end position of the motion vector of a previous block near the current block and spiraling toward the outside of the search range.

19. A storage medium as defined in claim 15, wherein the order for scanning is selected so as to prioritize scanning of the positions along the direction of the previously determined motion vector.

20. A storage medium as defined in claim 15, wherein the search range is divided into a plurality of areas and a respective scan order is defined for each area.

21. A bitstream representing a current motion vector between a current image and a reference image, the current motion vector determined by performing the steps of:

setting a search range for motion vector detection within the reference image;

determining an order for scanning the inside of the search range on the basis of a previously determined motion vector;

detecting the current motion vector by scanning the inside of the search range according to the order.

22. A bitstream as defined in claim 21, wherein the order includes priority scanning of a specific position or direction determined on the basis of the size and direction of the previously determined motion vector.

23. A bitstream as defined in claim 21, wherein:

the detecting includes detecting the current motion vector for a current block in a current frame by spirally scanning from the end position of the motion vector of a previous block in the same position in a previous frame as the current block in the current frame and spiraling toward the outside of the search range.

24. A bitstream as defined in claim 21, wherein:

the detecting includes detecting the current motion vector for a current block in a current frame by spirally scanning from the end position of the motion vector of a previous block near the current block and spiraling toward the outside of the search range.

25. A bitstream as defined in claim 21, wherein the order for scanning is selected so as to prioritize scanning of the positions along the direction of the previously determined motion vector.

26. A bitstream as defined in claim 21, wherein the search range is divided into a plurality of areas and a respective scan order is defined for each area.

27. The motion vector detecting apparatus as recited in claim 1, wherein:

the apparatus detects a motion vector of a current block in a current frame; and the motion vector output circuit obtains the motion vector by making a plurality of residual difference calculations, each residual difference calculation including a comparison of a block in the current frame with a corresponding block in a previous frame, the motion vector output circuit further performing the residual difference calculations until a particular residual difference calculation corresponding to a particular block is larger than a minimum of all the residual difference calculations determined up until the calculation of the particular residual difference calculation.

28. The method as recited in claim 9, wherein the detecting includes:

detecting a motion vector of a current block in a current frame;

performing a plurality of residual difference calculations, each residual difference calculation including a comparison of a block in the current frame with a corresponding block in a previous frame; and performing the residual difference calculations until a particular residual difference calculation corresponding to a particular block is larger than a minimum of all the residual difference calculations determined up until the calculation of the particular residual difference calculation.

29. The computer storage medium as recited in claim 15, wherein the detecting includes:

detecting a motion vector of a current block in a current frame;

performing a plurality of residual difference calculations, each residual difference calculation including a comparison of a block in the current frame with a corresponding block in a previous frame; and performing the residual difference calculations until a particular residual difference calculation corresponding to a particular block is larger than a minimum of all the residual difference calculations determined up until the calculation of the particular residual difference calculation.

30. The bitstream as recited in claim 21, wherein the detecting includes:

detecting a motion vector of a current block in a current frame;

performing a plurality of residual difference calculations, each residual difference calculation including a comparison of a block in the current frame with a corresponding block in a previous frame; and performing the residual difference calculations until a particular residual difference calculation corresponding to a particular block is larger than a minimum of all the residual difference calculations determined up until the calculation of the particular residual difference calculation.

31. A motion vector detecting apparatus for determining a current motion vector in a current block of a current frame, the apparatus comprising:

a current image input circuit which receives a current frame;

a reference image input circuit which receives a reference frame;

a search range setting circuit which defines a search range for motion vector detection within the reference frame;

a motion vector storage circuit which stores a previously determined motion vector;

a search order setting circuit which defines an order for scanning the inside of the search range on the basis of the previously determined motion vector;

a scan circuit which scans the inside of the search range according to the order; and a motion vector output circuit which determines the motion vector for the current block of the current frame based on an output of the scan circuit.

* * * * *